United States Patent [19]
Veldhuizen

[11] Patent Number: 5,835,771
[45] Date of Patent: *Nov. 10, 1998

[54] METHOD AND APPARATUS FOR GENERATING INLINE CODE USING TEMPLATE METAPROGRAMS

[75] Inventor: Todd Veldhuizen, Kitchener, Canada

[73] Assignee: Rogue Wave Software, Inc., Corvallis, Oreg.

[ * ] Notice: This patent issued on a continued prosecution application filed under 37 CFR 1.53(d), and is subject to the twenty year patent term provisions of 35 U.S.C. 154(a)(2).

[21] Appl. No.: 487,593

[22] Filed: Jun. 7, 1995

[51] Int. Cl.$^6$ ........................................ G06F 9/45
[52] U.S. Cl. .......................... 395/705; 395/709; 395/702
[58] Field of Search .................................... 395/701, 705, 395/709, 702

[56] References Cited

U.S. PATENT DOCUMENTS

| | | | |
|---|---|---|---|
| 3,898,438 | 8/1975 | Nater et al. | 235/151 |
| 4,956,800 | 9/1990 | Kametani | 364/736 |
| 5,237,691 | 8/1993 | Robinson et al. | 395/700 |
| 5,280,617 | 1/1994 | Brender et al. | 395/700 |
| 5,481,708 | 1/1996 | Kukol | 395/700 |

OTHER PUBLICATIONS

The Annotated C++ Reference Manual, by Margaret A. Ellis and Bjarne Stroustrup., ANSI Base Document, Chapter 14, pp. 342–351 and Chapter 19, pp. 422–426, published 1990.
C++ Strategies and Tactics, by Robert B. Murray, Addison–Wesley Professional Computing Series, Chapter 7, pp. 141–203, published 1993.

*Primary Examiner*—Emanuel Todd Voeltz
*Assistant Examiner*—Kakali Chaki
*Attorney, Agent, or Firm*—Hecker & Harriman

[57] ABSTRACT

The present invention provides the capability to generate customized, inlined code or expression objects using template metaprograms. The code or expression object is created at compile time using template parameters, if specified. At compile time, these parameters are used to determine the customized, inline code that is generated by the compiler. A general algorithm is used to convert algorithms into inline pieces of code. An algorithm, or program code segment, is selected for customization. A grammar is written to define the algorithm. A grammar is comprised of a set of production rules. Production rules contain symbols of the grammar. A symbol can be a terminal or non-terminal symbol. A production rule further includes parameters that can be used to further customize an instantiation of a template metaprogram. The algorithm is expressed using the production rules that comprise the grammar. Each production rule is translated into a template class or a specialization. A template metaprogram can further comprise template parameters. At compile time, the compiler uses the template metaprogram reference including template parameters specified to generate code. The template metaprogram that is referenced by the program code is used as a blueprint for the code that is generated by the compiler. The code generated by the compiler is customized, inlined code. Further, the process for creating and generating customized, inlined code provides for the creation and manipulation of objects that encapsulate expressions. Customized, inlined code can replace less efficient code thereby achieving increased run time efficiency. Code generation is done using the end user's compiler.

15 Claims, 4 Drawing Sheets

METHOD AND APPARATUS FOR GENERATING INLINE CODE USING TEMPLATE METAPROGRAMS

BACKGROUND OF THE INVENTION

1. Field of the Invention

This invention relates to the creation and generation of inlined, customized code.

2. Background Art

Before a software application can be executed on a computer system, it is expressed in a programming language. A programming language can be assembly language, for example, or a higher-level language such as Basic, C, or Pascal. The expression of a software application in a programming language is referred to as code. The code expresses a flow of execution for the operations that are performed in the software application. For example, the code expresses the flow of execution for retrieving input from a user of the application. Once the code is written, it is translated into object code using a compiler. The object code is linked with other necessary object code to generate machine language that can be executed by a computer system.

A compiler performs a process that is referred to as compilation. During compilation, the compiler parses the code to verify the code's syntax. Further, the compiler may perform an optimization step. During the optimization step, the compiler generates object code that optimizes one or more of a computer system's resources. For example, a compiler may modify the execution flow so that the application optimizes memory during execution. The compiler may optimize the code to make optimal use of the computer's central processing unit (CPU). The compiler can perform the optimization step on any code submitted to the compiler. However, the compiler cannot provide customized optimization (i.e., optimization that is not provided by the compiler). To provide customized optimization, it is necessary to write optimized code or generate optimized code by providing instructions to the compiler.

A programmer may write code that optimizes one or more computer resources. For example, a loop may be rewritten to achieve greater efficiency. A block of code that is repeated "n" number of times is referred to as an n-repetition loop. In many programming languages, a loop is expressed by a block of code that is embedded in a language construct that is referred to as a for loop. The for loop executes the embedded code for the number of times specified in the initial statement of the for loop (i.e., the for statement). The following provides an example of a for loop written in the "C" programming language:

```
for (int i = 0; i < 4; i = i + 1) {
    statement 1;
    statement 2;
    statement n;
}
```

In this for statement, i is the loop variable. It is initialized to 0 and incremented by one. The conditional portion of the for statement (i.e., i <4) indicates the condition upon which execution of the for loop is terminated. The for loop is executed while $0 \geq i < 4$. Therefore, the for loop is executed for i equal to 0, 1, 2, and 3 (i.e., four times). This is a 4-repetition loop. In addition to a for statement in the "C" programming language, a loop may be coded using while or do-while constructs, for example.

One method of optimization is to generate inline code that replaces code contained in the original program code. Using the for statement to illustrate, if the number of repetitions are known prior to compilation, the programmer can express a for loop by copying the statements inside the n-repetition loop n times. For example, the for loop illustrated above (repeated four times) is expressed as follows:

| | |
|---|---|
| statement 1; | //first repetition |
| statement 2; | |
| statement n; | |
| statement 1; | //second repetition |
| statement 2; | |
| statement n; | |
| statement 1; | //third repetition |
| statement 2; | |
| statement n; | |
| statement 1; | //fourth repetition |
| statement 2; | |
| statement n; | |

The repeated statement blocks are submitted to the compiler in place of the for loop code illustrated previously. The advantage of hand coding (i.e., customized coding performed by the programmer) is that the programmer can make the determination of how to best customize and optimize the code. However, one disadvantage of this technique is that the customization can only be used for the code currently being written (i.e., the current application). The programmer must write a different set of code where the for loop is executed ten times. The customization and optimization done by a programmer is therefore limited to a single application (e.g., an inlined version of a 4-repetition for loop contains the statements four times). Separate code must be written to handle a different case (e.g., an inlined version of a 10-repetition for loop). A further disadvantage is that the customization parameters (i.e., number of repetitions for a for loop) must be known at the time the programmer is writing code.

A preprocessor can be written to handle the customization of a particular type of algorithm (e.g., for loop). A preprocessor is executed prior to the compilation step. The programmer includes preprocessor statements, or directives, in the code. A C preprocessor, for example, has directives such as: #include, #define, #ifdef, #pragma. The #include directive is used to instruct the preprocessor to copy text from another file. The #define directive is used to define a macro. The #ifdef directive provides the ability to include lines of code dependent on a condition. The #pragma directive is used to inform the compiler of implementation-dependent issue such as unusual execution flow.

The compiler parses the program code. When a directive is encountered, the compiler performs the action specified by the directive. A preprocessor can be used to replace text in program code with another text string. Further, a preprocessor can be written to replace a for loop with inlined code. However, a preprocessor is limited to a particular set of optimizations (e.g., preprocessor to modify a for loop).

The C++ programming language provides the ability to define a family of types or functions. The construct that provides this ability is referred to as a template. A template may be a class template or a function template. A class template specifies how individual classes can be constructed. A function template specifies how individual functions can be constructed.

A template provides the ability to instruct the compiler how to generate code at compile time. A compiler detects the use of a template and generates the code contained in the template, if it has not already generated the code.

A template can have multiple template arguments. When a template is used, the actual types for the template arguments must be known. The compiler automatically generates implementations of the template by substituting the actual types for the template argument types. This is referred to as template instantiation. When the compiler detects that a template is being used, it instantiates a version of the template with the specified type arguments by making a copy of the definition of each required function with the actual template arguments substituted for the formal template arguments. The copy is compiled to produce object code that can then be passed to the linking step.

One use of templates, by Erwin Unruh, is to generate constant expressions (i.e., a literal or number such as 5, 8, or 10) by using the compiler as an interpreter. Appendix A contains the prime number program written by Erwin Unruh (Unruh program). Appendix A further illustrates the messages generated by the compiler as it interprets the Unruh program during compilation. The purpose of the Unruh program is to cause the compiler to generate error messages. The compiler messages identify a conversion error that is detected during the compilation process. Each error message contains a prime number. The Unruh program only works with text strings. Unruh generates a process for generating constants. Unruh does not generate code or expressions containing variables. Unruh only addresses a process for generating constant expressions.

The LISP programming language can support expressions in objects. However, the expressions are interpreted dynamically (during the execution of the program). Because expressions are interpreted dynamically, LISP is less efficient than code that is compiled and then executed.

As indicated above, it is beneficial to interpret both constants and expressions prior to compilation to create inline code. It is further beneficial to encapsulate the inlined code in objects.

SUMMARY OF THE INVENTION

The present invention provides the capability to generate customized, inlined code using template metaprograms. The code is created at compile time using template parameters that are known at compile time. At compile time, these parameters are used to determine the customized, inline code that is generated by the compiler. A general algorithm is used to convert algorithms into inline pieces of code. A template metaprogram has properties including template recursion and specialization.

A generalized technique for creating template metaprograms is provided. The generalized technique creates inlined code that is specific to an application.

An algorithm is selected for customization. A grammar is then written to define the algorithm. A grammar is comprised of a set of production rules. Production rules contain symbols of the grammar. A symbol can be a terminal or non-terminal symbol. A terminal symbol is a symbol that is not defined using another symbol. A terminal symbol is defined using programming language constructs. A non-terminal symbol is defined using other symbols. A production rule further includes parameters that can be used to further customize an instantiation of a template metaprogram.

The algorithm is expressed using the production rules that comprise the grammar. Each production rule is translated into a template class or a specialization. Collectively, these template classes or specializations comprise a template metaprogram. Further, a template metaprogram includes template parameters. A template parameter provides a means for an end user (e.g., software program developer) to provide instructions regarding instantiation of program code.

An end user includes a reference to a template metaprogram and any values for the parameters of the template metaprogram. At compile time, the compiler uses the reference and template parameters to generate code. The template metaprogram that is referenced by the program code is used as a blueprint for the code that is generated by the compiler.

The resulting code that is generated by the compiler is customized, inlined code. Customized, inlined code can replace a for loop thereby achieving increased run time efficiency. Code generation is accomplished using the end user's compiler. Therefore, there is no requirement for additional tools to generate code. An end user generates code for use with specific applications using existing tools available to the end user. Code can be tailored for an application.

DETAILED DESCRIPTION OF THE INVENTION

A method and apparatus for the creation and generation of inlined, customized code using template metaprograms is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
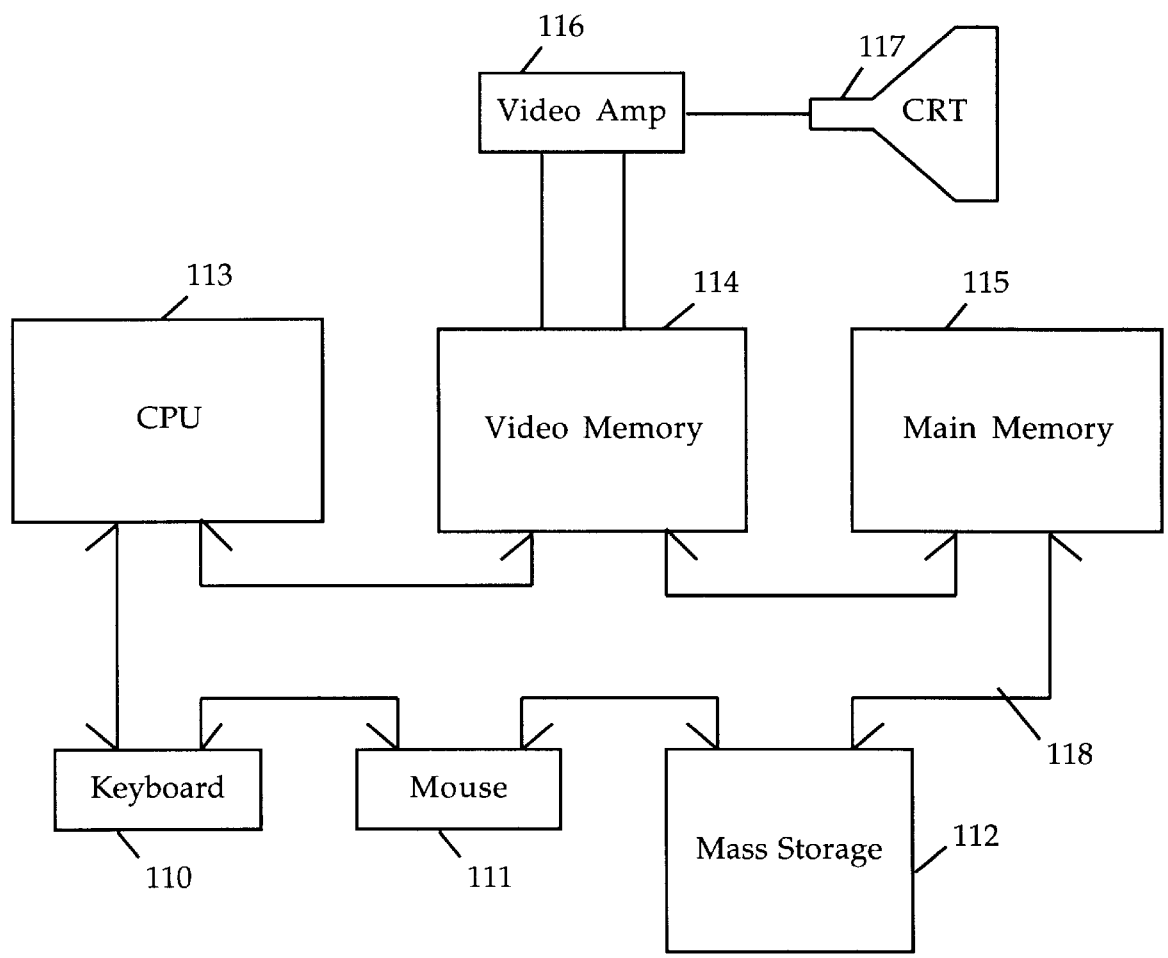
FIG. 1 illustrates a general purpose computer for use in the implementation of the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680x0 processor or a microprocessor manufactured by Intel, such as the 80x86, or Pentium processor.

However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment.

A general purpose computer system such as the one described above can become a special-purpose computer system when application software is executed by the computer system. Machine language programs are retrieved from storage. A machine language program contains instructions that are fetched and executed by CPU 113.

The present invention uses a general algorithm for converting program code algorithms into inline pieces of code. A template expression mechanism coupled with the template metaprogram mechanism can be used to generate customized inline code for expressions at compile time.

Template metaprograms are created which specialize generic algorithms. At compile time, parameters are used with the template metaprograms to determine the customization and inline code. Unlike subroutine or function parameters, template parameters are known at compile time. A template metaprogram runs at compile time. Source code contains both normal C++ run-time program code and template metaprograms. The compiler uses a template metaprogram reference and template parameters contained in the reference to generate customized, inline code. For example, a generic Fast Fourier Transform (FFT) algorithm can be specialized to operate on a specific input array size.

Figure 2:
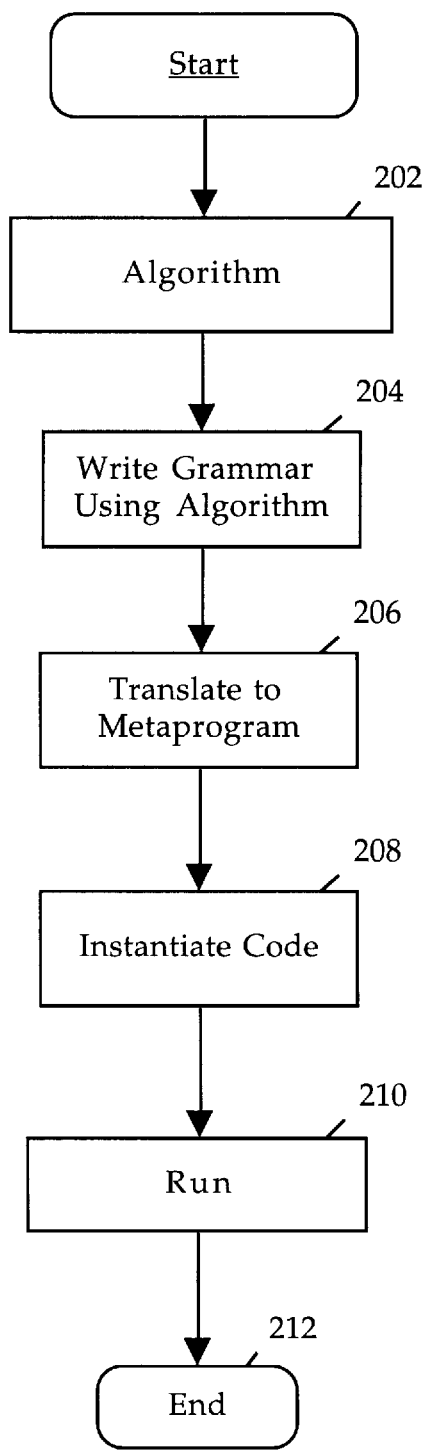
FIG. 2 provides an illustration of a process for the generation of customized, inlined code.

A generalized technique is used to create a template metaprogram to generate customized, inline code. FIG. 2 provides an overview of the process that is used to create a template metaprogram. To generate a template metaprogram, the algorithm that is implemented by an instantiation of a template metaprogram must be identified. Thus, at step 202, an algorithm is identified.

The selection of an algorithm may be based on whether greater efficiency can be gained by customizing the algorithm. One such algorithm is a bubble sort algorithm. A bubble sort algorithm contains one or more loops. A bubble sort algorithm may be optimized by eliminating loops. As previously discussed, a loop can be eliminated by replacing the loop with inlined code. To generate inlined code at compile time, the loop's counter(s) must be known at that time. The following provides an example of a bubble sort algorithm that contains loops:

```
inline void swap(int& a, int& b)
{
    int temp = a;
    a = b;
    b = temp;
} void bubbleSort(int* data, int N)
{
    for (int i = N - 1; i > 0; –i)
    {
        for (int j = 0; j < i; ++j)
        {
            if(data[j] > data[j + 1])
                swap(data[j], data[j + 1]);
        }
    }
}
```

The bubbleSort algorithm sorts an array of integers, data, in ascending order. It compares an integer with the next integer in the array. Where the first integer is greater than the second integer, the bubbleSort algorithm calls the swap routine to swap the two integers (i.e., the first and second integers swap positions in the array).

The bubbleSort algorithm includes two loops. The outer loop starts with the last integer in the array and decrements through the array to the first integer. Within the outer loop, an inner loop begins with the first integer in the array and ends with the current integer selected in the outer loop. It is within the inner loop that the comparison and swap operations of the algorithm are performed.

The above bubbleSort algorithm can be further streamlined by removing one of the loops and using recursion (i.e., a call to itself) as follows:

```
void bubbleSort(int* data, int N)
{
    for (int j = 0; j < N - 1; ++j)
    {
        if (data[j] > data [j + 1])
            swap(data[j], data[j + 1]);
    }
    if (N > 2)
        bubbleSort (data; N - 1);
}
```

The bubbleSort routine contains a loop and a call to itself. The bubbleSort routine further contains a base case (i.e., for termination of the bubbleSort recursive call). A recursive call is made only if N is greater than two. Thus, bubbleSort is not recursively called to handle the cases where N is equal to one or two. When N is equal to one or two, a special case of bubbleSort is needed. Thus, where j and N-1 are equal to zero, the loop is bypassed.

Referring to FIG. 2, once an algorithm is identified, a grammar (i.e., set of production rules) can be written based on the algorithm at step 204. The grammar identifies terminal and non-terminal symbols that can be used to identify template classes. A non-terminal symbol is expressed as other symbols (terminal or non-terminal symbols) of the grammar. A terminal symbol is not expressed using other symbols of the grammar. A terminal symbol is defined using programming language constructs. The symbols of a grammar that can be used to represent the bubble sort routine provided above are as follows:

1. IntBubbleSort<N>
2. IntBubbleSort<1>
3. IntBubbleSortLoop<I,J>
4. IntBubbleSortLoop<0,0>
5. IntSwap<I,J>

The first and second symbols represent the main routine, bubbleSort. The first symbol is meant to handle the general case (i.e., where N is not equal to one). The second symbol represents the special case of the main routine (i.e., when N is equal to one). The third and fourth symbols represent the general and special termination case for the loop contained in the main routine. The parameters, I and J represent the loop counters illustrated in the two loop example of bubbleSort provided above. The fifth symbol represent the swap routine.

Each of the symbols must be further defined to identify the routines represented by the symbols. For example, the first symbol, IntBubbleSort<N>, represents the main routine. The main routine included a loop and a call to itself. Therefore, the first symbol includes the IntBubbleSortLoop and IntBubbleSort symbols, where both IntBubbleSortLoop and IntBubbleSort are non-terminal symbols. Similarly, the second symbol is used to handle the special case where N is equal to one. In that case, there is no need to perform any further processing and there is no need to use any other symbols to further define IntBubbleSort<1>. Thus, IntBubbleSort<1> is a terminal symbol.

The fifth symbol is further refined to identify the code that is used in the swap routine (i.e., swap data positions only when the first integer is greater than the second). The third and fourth symbols are further defined to handle the general and special cases of the loop algorithm. In the general case, the IntSwap<I,J> and IntBubbleSortLoop symbols are used. The following illustrates each of the five symbols with additional definition:

1. IntBubbleSort<N>:
IntBubbleSortLoop<N − 1,0> IntBubbleSort<N − 1>

2. IntBubbleSort<1> :
(nil)

3. IntBubbleSortLoop<I,J>:
IntSwap< J,J + 1> IntBubbleSort< (J + 2 <= I)?I:0,
(J + 2 <= I)?(J + 1):0>

4. IntBubbleSortLoop<0,0>:
(nil)

5. IntSwap<I,J>
if (data[I] > data [J]) swap (data[I], data[J]);

At step 206 of FIG. 2, the grammar generated in step 204 is used to create a template metaprogram. A template metaprogram provides instructions for generating a specialized algorithm or code. The production rules that comprise the grammar are used to generate a template class or a specialization. The following illustrates the template classes that can be generated for the bubble sort routine using the grammar, or production rules, identified above:

```
1. template< int N>
class IntBubbleSort {
public:

static inline void sort(int* data)

{

IntBubbleSortLoop<N − 1,0>::loop(data);
      IntBubbleSort<N − 1> ::sort(data);

}

};

class IntBubbleSort<1> { public:

static inline void sort (int* data)

{}

};

2. template<int I, int J> class IntBubbleSortLoop { private:

enum {go = (J <= I − 2)};

public:

static inline void loop (int* data)

{

IntSwap<J, J + 1> ::compareAndSwap(data);

IntBubbleSortLoop<go ? I : 0, go ? (J + 1) : 0>::loop(data);

}

};

class IntBubbleSortLoop<0,0> { public:

static inline void loop(int*)

{}

};

template<int I, int J> class IntSwap { public:

static inline void compareAndSwap(int* data)

{ if (data[I] > data[J])

swap(data[I], data[J]);

}

};
```

The first template class, or template metaprogram segment, is built using the first and second production rules (i.e., the IntBubblesort production rules). It contains a template class for the general (i.e., N is greater than one) and the special case (i.e., N is equal to one). Similarly, the second template class corresponds with the third (general case) and fourth (special case) (IntBubbleSortLoop) production rules. The general template class associated with the IntBubbleSortLoop production rule is instantiated where the template parameters, I and J, are not zero. The specialization template class is used where the template parameters, I and J, are equal to zero. The third template class is based on the fifth production rule (IntSwap).

At step 208, the template metaprogram is used to generate application software. Template metaprograms are used by an end user (e.g., application programmer) to generate application software. The end user chooses the parameters that are used by the compiler to generate the customized code. The source code generated by an end user contains a reference to a template metaprogram along with values for the template parameters.

Each of the template classes include one or more template parameters (e.g., I and J in the third metaprogram). The compiler instantiates a customized version of the code using the parameters and the template metaprogram. Once a template metaprogram is created, an object that encapsulates the template metaprogram can be created and manipulated. Often, template metaprograms are used statically and no object creation is necessary.

To illustrate, the end user includes the following code in an applications program code for a bubble sort:

```
int data[4];
    .
    .
    .
IntBubbleSort<4>::sort(data);
```

The code contains a reference to the IntBubbleSort metaprogram provided above. In addition, the reference contains a value for the number of data items, N, in the integer array. The number of data items is known at compile time. However, the values contained in the integer array are not known. Since the customized code that is generated by the compiler can be executed on any valid values contained in the data array, it is not necessary to specify the data at compile time. Thus, there are two types of parameters: the parameters whose values are known at compile time, and those parameters whose values are not known until run time.

The compiler generates the customized code using the template metaprogram and the template parameter(s) specified at compile time. For example, the compiler generates the following code based on the IntBubbleSort statement in the program code:

```
static inline void IntBubbleSort<4>::sort(int* data)
{
    IntBubbleSortLoop<3,0>::loop(data);
    IntBubbleSortLoop<2,0>::loop(data);
    IntBubbleSortLoop<1,0>::loop(data);
}
```

The IntBubbleSortLoop is then replaced using code inside the IntBubbleSortLoop template class previously defined. The following code is the result of the replacement:

```
static inline void IntBubbleSort<4>::sort(int* data)
{
    IntSwap<0,1>::compareAndSwap(data);
    IntSwap<1,2>::compareAndSwap(data);
    IntSwap<2,3>::compareAndSwap(data);
```

```
    IntSwap<0,1>::compareAndSwap(data);
    IntSwap<1,2>::compareAndSwap(data);
    Intswap<0,1>::compareAndSwap(data);
}
```

The IntSwap reference can be resolved by the compiler using the IntSwap template class as follows:

```
static inline void IntBubbleSort<4>::sort(int* data)
{
    if (data[0]>data[1])swap(data[0],data[1]);
    if (data[1]>data[2])swap(data[1],data[2]);
    if (data[2]>data[3])swap(data[2],data[3]);
    if (data[0]>data[1])swap(data[0],data[1]);
    if (data[1]>data[2])swap(data[1],data[2]);
    if (data[0]>data[1])swap(data[0],data[1]);
}
```

The final version of the code generated by the compiler is inlined code. Using the template metaprograms and the parameter(s) specified by the end user, the compiler created customized, inlined code. There are no loops in the resulting code. Thus, an algorithm that contains loops can be rewritten at compile time using a standard compiler to eliminate undesirable code. By eliminating loops, the resulting code is more efficient than the original code. Further, the code is generated by the compiler. The end user does not have to hand code an algorithm to achieve more efficient, customized code. Further, the resulting code can be achieved using an existing compiler. There is no need to write a preprocessor to generate code.

Once the compilation is completed, the resulting code can be linked to create executable code. The executable code is run at step 210. The generalized technique ends at step 212.

Symbols

As previously indicated, a template metaprogram can contain terminal symbols. A terminal symbol may contain code. The code contained in a terminal symbol includes programming language constructions such as if-else, switch, and loops. Template metaprograms can be used to implement these constructs. For example, Table 1 provides an example of the template metaprogram implementation of the C++ if-else statement.

TABLE 1

| C++ Version | Template metaprogram version |
|---|---|
| if (condition)<br>statement1;<br>else<br>statement2; | //Class declarations<br>template<bool C><br>class name {};<br><br>class name<true>{<br>public:<br>static inline void f()<br>{statement1;} //true case<br>class name<false>{<br>public:<br>static inline void f()<br>{statement2;} //false case<br>};<br>//Replacement for if-else statement:<br>name<condition>::f(); |

The template class generates either statement1 or statement2 depending on the value of condition (i.e., true or false). The place holder condition is used as a template parameter. It is known at compile time. Arguments may be passed to the function f( ) as either template parameters of name or function arguments of f( ). The name<condition>::f( ); is used in the code as a replacement for the if-else statement. The value given to condition is used to determine which statement is instantiated.

Another construct that can be implemented using template metaprograms is the switch statement. A switch statement contains a list of case statements that test the value of the switch statement variable, i. Where i is equal to the value contained in the case statement, the code associated with the case statement is executed (e.g., statement1 is executed where i and value1 are equal). If the value of i is known at compile time, there is no need to perform the switch statement at run time. Using template metaprograms, it is possible to instantiate only the code that is needed for the appropriate case. The switch statement is not performed at runtime.

The runtime code does not include the irrelevant statements. Table 2 contains a template metaprogram version of a switch statement.

TABLE 2

| C++ Version | Template metaprogram version |
|---|---|
| int i; | //Class declarations |
|  | template<int I> |
| switch(i) | class name { |
| { | public: |
| case value1: | static inline void f() |
| statement1; | {default-statement;} |
| break; | }; |
| case value2: | class name<value1>{ |
| statement2; | public: |
| break; | static inline void f() |
|  | {statement1;} |
| default: | }; |
| default-statement; |  |
| break; | class name<value2>{ |
|  | public: |
| } | static inline void f() |
|  | {statement2;} |
|  | //Replacement for switch statement: |
|  | name<I>::f(); |

The template metaprogram in Table 2 includes a template argument, I, that is known at compile time. The template metaprogram in Table 2 is used by the compiler to generate either statements, statement2, or the default-statement based on the value of I.

As previously discussed, a loop can be implemented using template metaprograms. Loops are implemented using template recursion. Table 3 illustrates a template metaprogram for generating an n-repetition loop. The C++ construct illustrated in Table 3 is the do-while construct. A similar implementation is possible for while and for loops.

TABLE 3

| C++ Version | Template metaprogram version |
|---|---|
| int i = N; | // Class declarations |
|  | template<int I> |
| do { | class name { |
| statement; | private: |
| }while (--i > 0); | enum{go = (I-1)!=0}; |
|  | public: |
|  | static inline void f() |
|  | { |
|  | statement; |
|  | name<go?(I-1):0>::f(); |
|  | } |
|  | }; |
|  | // Specialization provides base case |
|  | // for recursion |

TABLE 3-continued

| C++ Version | Template metaprogram version |
|---|---|
|  | class name<0>{ |
|  | public: |
|  | static inline void f() |
|  | {} |
|  | }; |
|  | // Equivalent loop code |
|  | name<N>::f(); |

Using the template metaprogram in Table 3, statement is generated N times. The symbol, statement, may be one statement or a block of statements. The code generated by statement can vary depending on the loop index, I. The template metaprogram uses a conditional expression operator, ?:, to determine whether recursion should be continued or terminated.

In C++, temporary variables are used to store the result, or intermediate result, of a computation or to simplify a complex expression by naming subexpressions. The following program segment illustrates the use of temporary variables for template metaprograms. The temporary variables are used to count the number of bits set in the lowest nibble of an integer.

TABLE 4

| C++ Version | Template Metaprogram Version |
|---|---|
| int countBits(int N) | template<int N> |
| { | class countBits { |
| int bit3=(N & 0x08)?1:0, | enum |
| bit2=(N & 0x04)?1:0, | bit3 = (N & 0x08)?1:0, |
| bit1=(N & 0x02)?1:0, | bit2 = (N & 0x04)?1:0, |
| bit0=(N & 0x01)?1:0; | bit1 = (N & 0x02)?1:0, |
|  | bit0 = (N & 0x01)?1:0}; |
| return bit0+bit1+bit2+bit3; |  |
| } | public: |
|  | enum {nbits = bit0+bit1+bit2+bit3}; |
| int i = countBits(13); | } |
|  | int i = countBits<13>::nbits; |

In the C++ version, the bits to be counted are passed to the countBits subroutine. The temporary variables (bit3, bit2, bit1, bit0) are used to store each bit of the value passed to countBits. The temporary variables are then added together and their sum is returned to the calling procedure.

Temporary variables can be implemented in a template metaprogram using an enumerative type. Identifiers (bit3, bit2, bit1, bit0) receive the value as determined by the condition expression operation in an enumeration declaration. Another identifier, nbits, is equated to the accumulation of the bit3, bit2, bit1, bit0 identifiers using an enumeration declaration. The value that is to be examined for a count of bits is passed as a template argument (N). The C++ temporary variables, bit3, bit2, bit1, bit0, are replaced by enumerative types bit3, bit2, bit1, bit0.

C++ Library Function Example

The C++ programming language provides several library functions. A C++ function library might include trigonometric functions such as sine and cosine functions. A sine function can be evaluated using the following series, for example:

$$\sin x = x - \frac{x^3}{3!} + \frac{x^5}{5!} - \frac{x^7}{7!} + \ldots$$

A C implementation of sine series illustrated above is as follows:

```
// Calculate sin(x) using j terms float sine(float x, int j)

{ float val = 1;

for (int k = j - 1; k >= 0; --k)

val = 1 - x*x/(2*k + 2)/(2*k + 3)*val;

return x* val;

}
```

Using the algorithm provided in the above C implementation, production rules grammar analogies can be identified. Corresponding template classes to evaluate sin x can then be defined. Initially, the variable x is set to: 2III/N since only integer template parameters may be used.

Variables I and N are template parameters. The following illustrates production rules that can be used to define templates for a sine function:

1. Sine<N, I>:

x * SineSeries<N, 1, 10, 0>

2. SineSeries<N, I, J, K>:

1 - x*x/(2*K + 2)/(2*K + 3) * SineSeries<N*go, I*go, J*go, (K + 1)*go>

3. SineSeries< 0, 0, 0, 0>:

1;

In the above production rules, go equates to (K+1) !=J. The first production rule defines the main rule that invokes the second production rule. The third production rule is a specialization that handles the loop termination. The second production rule handles all other cases. Using the production rules provided above, the following template metaprogram segments can be defined:

```
1.  template<int N, int I>
    class Sine {
    public:
    static inline float sin()
    {
    return (I*2*M_PI/N) * SineSeries<N,I,10,0>::accumulate();
    }
    };
2.  // Compute J terms in the series expansion. K is the loop variable.
    template<int N, int I, int J, int K>
    class SineSeries {
    public:
    enum {go = (K+1!=J)};
    static inline float accumulate()
    {
    return 1 - (I*2*M_PI/N)*(I*2*M_PI/N)/(2*K+2)/(2*K+3)*
    SineSeries<N*go, I*go, J*go, (K+1)*go>::accumulate();
    }
    };
3.  // Specialization to terminate loop
    class SineSeries<0,0,0,0>{
    public:
    static inline float accumulate()
    { return 1; }
    };
```

The metaprogram segments 1, 2, and 3 correspond to production rules 1, 2, and 3. The second metaprogram segment contains a class identified as SineSeries. The class definition includes a return statement that contains a reference to SineSeries. Thus, when the compiler generates an instance of SineSeries it may be necessary recursively instantiate other instances of SineSeries. To recursively instantiate SineSeries, the compiler instantiates either the second or third metaprogram depending on the values of the template arguments. Where the template arguments are all zero, the compiler creates an instance of SineSeries using the third metaprogram segment. Where one of the template arguments is nonzero, the second metaprogram is used by the compiler.

Because the template arguments are known at compile time, it is possible to evaluate a sine function at compile time using the template metaprogram provided above. For example, program code submitted to the compiler contains the following statement:

float f= Sine <32,5>::sin( );

The statement contains a reference to the first metaprogram segment and identifies the values for the template arguments N and I (32 and 5, respectively). The Sine metaprogram segment contains a reference to SineSeries. The compiler must create an instance of SineSeries to resolve this reference. Because the arguments following this reference are nonzero, the compiler uses the second metaprogram segment to resolve this reference. As discussed above, the second metaprogram segment contains a reference to itself. The compiler must therefore create another instance of SineSeries to resolve this reference. This process of instantiation continues until the compiler determines that the arguments for SineSeries are all zero. At this point, the compiler creates an instance of SineSeries using the third metaprogram. Once all of the references are resolved, the compiler can perform the return statements in the Sine and SineSeries code.

The result of this process is that the statement provided above can be compiled into a single assembly statement such as:

mov dword ptr [bp-4], large 03F7A2DDEh

The literal 03F7A2DDEh represents the floating point value 0.83147 which is the sine of 2II5/32.

The program code statement is evaluated at compile time, and the result is stored as part of the processor instruction. Sine and cosine values are typically determined during execution. Instead of determining the values during execution, the present invention provides the ability to create metaprograms that provide the capability of determining values (e.g., sine and cosine values) at compile time. This increases the efficiency of an executable program, since it is not necessary to calculate values during execution.

The present invention can be used to implement an inlined Fast Fourier Transform (FFT). Using template metaprograms, the compiler can do much of the work at compile time. For example, sine and cosine functions of an FFT can be evaluated at compile time. Therefore, it is not necessary to perform table lookups during execution. Template metaprograms can create an inlined FFT that contains no loops or function calls. Also, specialization can be used to handle special cases. For example, specialization can be used to replace y=a* cos (0)+b* sin (0);

with y=a;

Expression Object

Expression templates provide the capability to create temporary classes that represent parse trees. An expression object is an instance of an expression template. An expression object is a specific type that represents an expression. An expression object may include code within the object. The following code contains a reference to a function, integrate, having an expression as one of the parameters. The integrate function and the expression parameter are used to generate an expression object and a subprogram that is expecting the expression object:

```
I=integrate (1/(1+x), a, b);
```

The template metaprogram capability of the present invention can be used to make standard library functions more efficient. For example, some C++ class libraries contain matrix and vector classes. However, C++ is not very efficient in evaluating algebraic expressions containing vectors and matrices. C++ uses temporary variables to evaluate algebraic expressions involving a vector or matrix. For example, to add three vectors (a, b, and c), a C++ compiler, using C++ library functions, generates the following code:

```
Vector<double> _t1=a+b;

Vector<double> _t2=_t1+c;

y=_t2;
```

The vector addition is performed in three stages. The first stage adds vectors a and b and stores the result in a temporary variable, _t1. The third vector, c, is added to the temporary variable, _t1. The result of this operation is stored in temporary variable, _t2. The result stored in _t2 is then copied to y. Each line in the code is evaluated with a loop. Thus, three loops are needed to evaluate the expression y=a+b+c. In addition to the processing time necessary to perform each of these loops, it is necessary to allocate storage for the temporary vectors.

Alternatively, it would be beneficial to evaluate the expression in a single pass by combining the three loops into one. That is, the following code is more beneficial than the previous code:

```
// double *yp, *ap, *bp, and *cp are pointers to the y, a, b, and c vectors.

//double *yend is the end of the y vector.

do {

*yp = *ap + *bp + *cp;

++ap; ++bp; ++cp;

} while (++yp ! = yend);
```

The illustrated code uses a single loop to perform the vector operations performed using temporary variables. As indicated above, template metaprograms can be used to create more efficient expression objects. Template metaprograms can be used to eliminate the loop used to perform a vector operation, for example. The expression templates technique can be combined with the template metaprogram capabilities of the present invention to increase the efficiency of matrix and vector classes, for example.

Expression templates provide the ability to parse an expression at compile time and store the resulting expression tree as nested template arguments. In C, expressions are usually passed to a function using a pointer to a callback function containing the expression thereby creating a lot of processing overhead where repeated calls must be made. Expression templates allow an expression to be passed to a function as an argument and inlined into the function body.

An expression is parsed at compile time and then stored as nested template arguments of an "expression type". Operators such as +, −, *, and / are overloaded (i.e., give the operators additional meaning) to embed subexpressions as template arguments of a returned expression type. As an expression is parsed by the compiler, an object type is built that is capable of carrying out the vector or matrix operations in a single pass.

The following provides an example of a template that defines a function that can accept an expression as an argument:

```
template<class Expr> void evaluate (DExpr<Expr> expr, double start, double end)

{ const double step = 1.0;

for (double i = start; i < end; i += step)

cout << expr(i) << endl;

}
```

The template definition of a function that accepts an expression as an argument (e.g., evaluate) includes a template parameter for the expression type. In this example, an expression is represented by an instance of the class DExpr<A>. The DExpr class is a wrapper that disguises expression types DBinExprOp (a binary operation on two subexpressions), DExprIdentity (a variable or placeholder), or DExprLiteral (a constant or literal). Template parameter, A of DExpr<A>, represents the actual expression that is one of the types just described. The operators are overloaded to generate the expression object. The following provides an example of an overloaded operator definition for DExpr:

```
template<class A, class B>

DExpr<DBinExprOp<DExpr<A>, DExpr<B>, DApAdd> > operator + (const DExpr<A> & a, const DExpr<B>& b)

{ typedef DBinExprOp<DExpr<A>, DExpr<B>, DApAdd> ExprT;

return DExpr<ExprT>(ExprT(a,b);

}
```

The return type contains a DBinExprOp. DBinExprOp represents a binary operation with template parameters DExpr<A> and DExpr<B> that represent the two expressions that are the operands of the binary operation. The third template parameter is an applicative template class that encapsulates the addition operation. By disguising expressions using DExpr<> one operator can be used to handle each of the combinations of DBinExprOp<>, DExprIdentity, and DExprLiteral. If this technique is not used, eight different operators must be written to handle the combinations.

An example of a function that is evaluated by the evaluate routine is:

$$f(x) = \frac{x}{1+x}$$

Figure 3A:
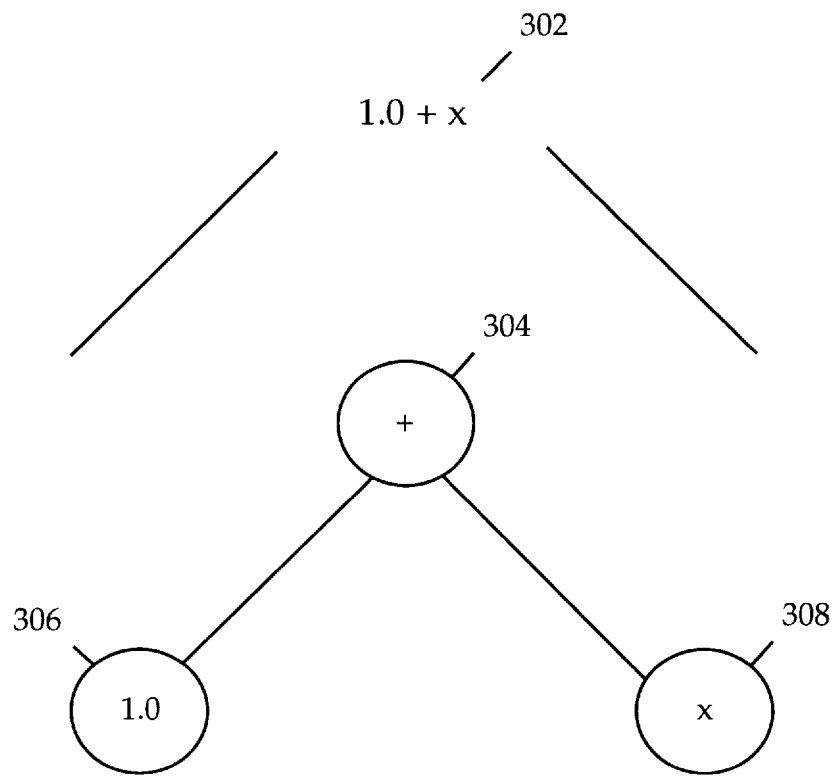
FIG. 3A provides an illustration of an expression parse tree.
Figure 3B:
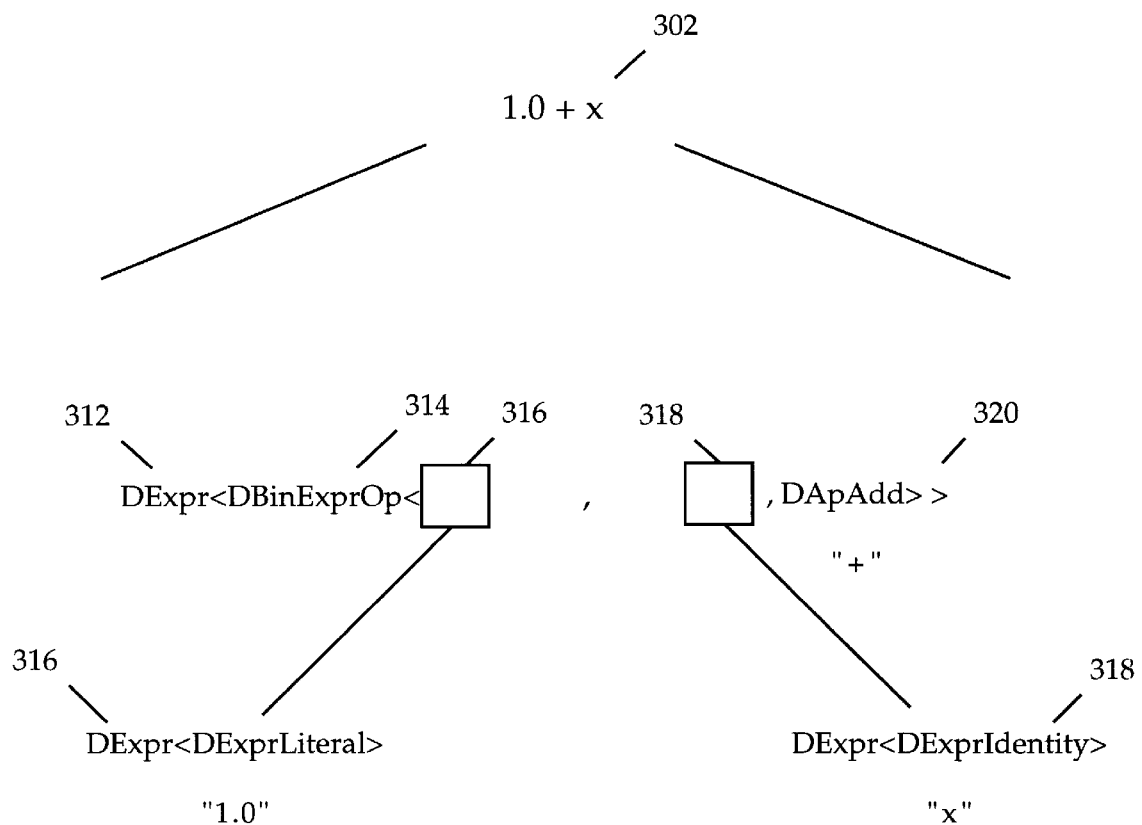
FIG. 3B provides an illustration of an expression parse tree generated by a compiler.

The function, f(x), contains the subexpression 1+x. FIG. 3A illustrates a parse tree for this expression. Subexpression 302 contains a binary operation 304 (+). Binary operation 304 has as its operands literal 306 (1.0) and placeholder 308 (x). An expression object generated by the compiler is illustrated in FIG. 3B. Subexpression 302 is represented by an instance of class DExpr 312. As described above, class DExpr 312 has a template parameter, A, that represents the actual expression. In this case, template parameter A is type DBinExprOp 314 (a binary operation on two subexpressions). DBinExprOp 314 has subexpressions 316 and 318 as parameters. Subexpression 316 is type DExprLiteral. Subexpression 316 represents the literal, 1.0, in the expression. Subexpression 318 represents the placeholder, x, in the expression.

DBinExprOp 314 further includes a parameter 320 that is of type DApAdd. Parameter 320 is an applicative template class that represents an addition operation. An applicative template class provides an inline operator( ) that can apply an operation to its arguments and return a result. An example of a DApAdd applicative template class is as follows:

```
//DApAdd -- add two doubles class DApAdd { public:

static inline double apply (double a, double b)

{ return a + b; }

};
```

For expression templates, the application function should be a static member function. Because operator ( ) cannot be declared static, a member function (e.g., apply( )) is used. Additional information regarding applicative template classes can be found in the Standard Template Library (STL) available from Hewlett Packard Laboratories. The STL is a part of the ISO/ANSI Standard C++ Library.

When the evaluate example is compiled, the compiler creates an instance of evaluate that substitutes the value of expr where appropriate. For example, where the compiler encounters the code:

evaluate(x/(1.0+x), 0.0, 10.0);

the compiler generates the following code.

for (double i = 0.0; i<10.0; i += 1.0)

cout<<i/(1.0 + i)<<endl;

The expression object is not instantiated until run time. However, the expression type is inferred at compile time. An instance of this expression type is passed to the evaluate function as the first argument. When the fragment expr(i) is encountered, the compiler builds the expression inline. The compiler substitutes i for the placeholder, x.

By combining template metaprograms and expression templates, matrix and vector classes can be constructed such that efficient, inline code can be generated by the compiler. For example, the compiler reads the following code:

Vector<double, 4>y, a, b, c;

y=a+b+c;

The compiler then generates the following code:

y[0] = a[0] + b[0] + c[0];

y[1] = a[1] + b[1] + c[1];

y[2] = a[2] + b[2] + c[2];

y[3] = a[3] + b[3] + c[3];

The code generated by the compiler executes faster than the code containing loops. Similar inlined implementations are possible for matrix-vector products, back substitution, dot products, and other common operations.

As indicated above, template metaprograms can be used to make expression object algorithms more efficient. Appendix B provides examples of expression templates code written for the C++ programming language. Listings One and Two provide an example for integration. This example uses the double fundamental type. The example can be modified to handle other types as well. A vector expression example is provided by Listings Three and Four.

Listing One is a header file that defines the expression classes. As indicated above, the DExpr expression dass is a wrapper dass that contains the DExprIdentity, DExprLiteral, and DBinExprOp classes. The header also contains applicative template classes DApAdd and DApDivide for adding and dividing two numbers. Other applicative template classes can be added for additional operations. DBinExprOp represents a binary operation on two expressions. A and B represent the two expressions and Op is an applicative template representing the operation. The operators (operator+ and operator/) are also defined in Listing One. As with the applicative template classes, additional operators can be defined for other operations.

Listing Two provides a sample program that references the classes defined by Listing One. When the compiler encounters these references, it instantiates code and/or expression objects using the definitions provided in Listing One. The program includes a definition of an evaluate routine that evaluates an expression template at a range of values. The main program contains a definition for DPlaceholder which acts as a typedef for DExpr<DExprIdentity>. The main program invokes the evaluate routine to evaluate the expression x/1.0+x. Listing Two illustrates the output that the evaluate routine generates (e.g., 0, 0.5, 0.666667, 0.75, 0.8, etc.).

Optimized vector expressions can be generated as illustrated in Listings Three and Four. Listing Three provides a header file that contains a DVec vector class. DVecAssignable is a virtual function that is used to implement DVec::operator=(expr). Also included in Listing Three are the DApAdd, DApDivide, DApSubtract, and DApMultiply binary applicative templates. The assignResult( ) routine stores an expression result into a vector. Vector expressions are inlined into this routine. A vector expression iterator, DVExpr, is defined in Listing Three. DVBinExprOp is an "lapplicative iterator" that acts as an applicative template and an iterator. Listing Four provides an example of a program for optimized vector expressions. Program output is also illustrated in Listing Four.

Thus, a method and apparatus for the creation and generation of inlined, customized code using template metaprograms has been provided.

I claim:

1. A template creation method for generating program code in a computer system comprising the steps of:

identifying one or more steps to be performed in said program code;

defining a grammar to represent said one or more steps;

defining a template using said grammar, said template including a plurality of template parameters;

replacing said one or more steps with a reference to said template in said program code, said reference including values for said template parameters;

creating replacement code for said one or more steps in said program code at compile time, said replacement code based on said template parameter values and created using said template and said template parameter values;

replacing said reference with said replacement code at compile time.

2. The method of claim 1 wherein said compiler is a C++ compiler.

3. The method of claim 1 wherein said grammar is comprised of a plurality of terminal and non-terminal symbols.

4. The method of claim 3 wherein each non-terminal symbol is defined using a plurality of terminal and non-terminal symbols.

5. The method of claim 3 wherein each terminal symbol is defined using programming language constructs.

6. The method of claim 1 wherein said template defines a template class.

7. The method of claim 1 wherein said template defines a specialization.

8. The method of claim 1 wherein said one or more steps is an n-repetition loop that repeats a block of statements n times.

9. The method of claim 8 wherein said replacement code comprises n versions of said block of statements, each of said n versions executes one iteration of said n-repetition loop.

10. A method for generating optimized expression objects comprising the steps of:

identifying one or more steps to be performed in said program code;

defining a grammar to represent said one or more steps;

defining a template using said grammar, said template including a plurality of template parameters;

replacing said one or more steps with a reference to said template in said program code, said reference including values for said template parameters, one of said template parameters being an expression;

parsing said expression;

inferring an expression type for said expression;

creating replacement code for said one or more steps in said program code at compile time, said replacement code based on said template parameter values and created using said template and said template parameter values;

replacing said reference with said replacement code at compile time.

11. The method of claim 10 further including the step of instantiating an expression object for said expression at run time.

12. The method of claim 11 wherein said expression object includes code.

13. The method of claim 11 wherein said replacement code uses said expression object at runtime.

14. The method of claim 10 wherein said replacement code includes said expression type.

15. The method of claim 10 wherein said template parameters includes a template parameter for said expression type.

* * * * *